United States Patent
Peting et al.

(10) Patent No.: US 9,934,191 B2
(45) Date of Patent: Apr. 3, 2018

(54) SYSTEMS AND METHODS FOR ASSIGNING ADDRESSES TO SERIALLY ARRANGED CIRCUIT NODES

(71) Applicant: NEOFOCAL SYSTEMS, INC., Portland, OR (US)

(72) Inventors: Mark Peting, Yamhill, OR (US); Dale Beyer, Portland, OR (US); Tsutomu Shimomura, Incline Village, NV (US)

(73) Assignee: NEOFOCAL SYSTEMS, INC., Portland, OR (US)

( * ) Notice: Subject to any disclaimer, the term of this patent is extended or adjusted under 35 U.S.C. 154(b) by 331 days.

(21) Appl. No.: 14/448,780

(22) Filed: Jul. 31, 2014

(65) Prior Publication Data

US 2016/0034414 A1 Feb. 4, 2016

(51) Int. Cl.
*G06F 13/42* (2006.01)
*G06F 13/40* (2006.01)

(52) U.S. Cl.
CPC ...... *G06F 13/4282* (2013.01); *G06F 13/4068* (2013.01); *G06F 2213/0052* (2013.01)

(58) Field of Classification Search
CPC .............................................. G06F 2213/0052
USPC ............................................................. 710/9
See application file for complete search history.

(56) References Cited

U.S. PATENT DOCUMENTS

| | | | | |
|---|---|---|---|---|
| 4,773,005 A * | 9/1988 | Sullivan | ............... | G06F 12/0661 710/9 |
| 2003/0167360 A1* | 9/2003 | Heinrich | ............... | H04L 12/403 710/3 |
| 2006/0125549 A1* | 6/2006 | Kawamata | ........... | G11C 29/785 327/525 |
| 2006/0136621 A1* | 6/2006 | Tung | ...................... | G06F 13/385 710/62 |
| 2006/0253615 A1* | 11/2006 | Flach | .................... | G06F 13/385 710/3 |
| 2009/0144471 A1* | 6/2009 | Lin | ...................... | G06F 13/4252 710/110 |
| 2011/0289237 A1* | 11/2011 | Zhang | ................. | G06F 13/4247 710/9 |
| 2012/0271924 A1* | 10/2012 | Spitaels | ............. | H04L 61/2092 709/220 |
| 2014/0336821 A1* | 11/2014 | Blaine | .................. | A61H 33/005 700/275 |

* cited by examiner

*Primary Examiner* — Glenn A Auve
(74) *Attorney, Agent, or Firm* — Marger Johnson

(57) ABSTRACT

In order to control individual circuit nodes coupled to a common serial line, each of the different circuit nodes must be assigned a locally unique address. However, mass manufactured electronics are manufactured as identical electronic devices. Thus, several techniques are presented for assigning unique addresses to identical electronic devices coupled to a common serial line. One set of techniques uses a local sensor that is stimulated in order to specify a single device on the serial line. Another set of techniques measures a pulse presented onto the common serial by a circuit node to determine its relative position on the serial line.

5 Claims, 11 Drawing Sheets

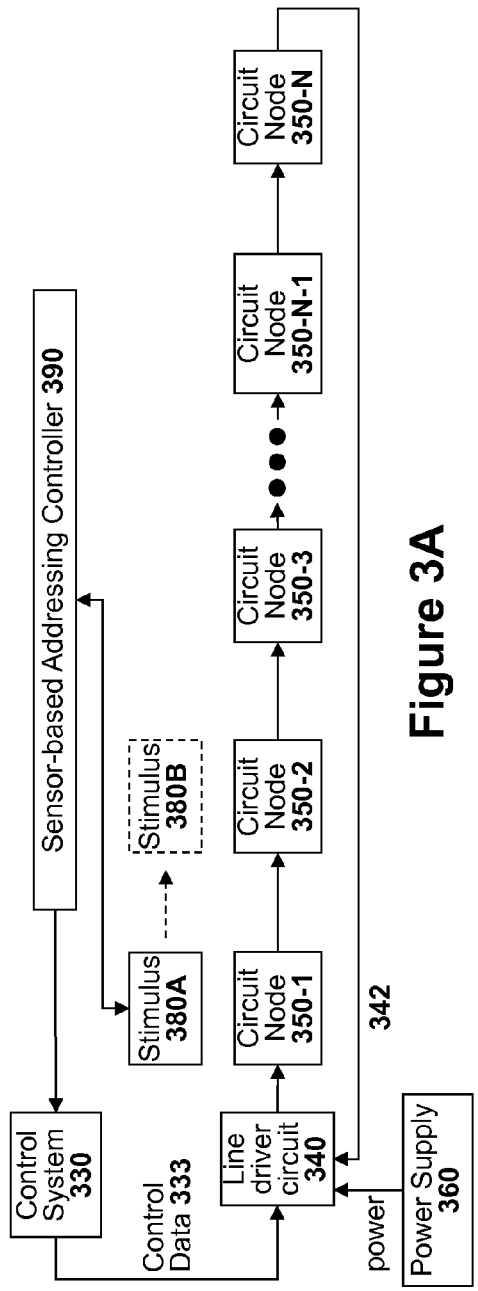
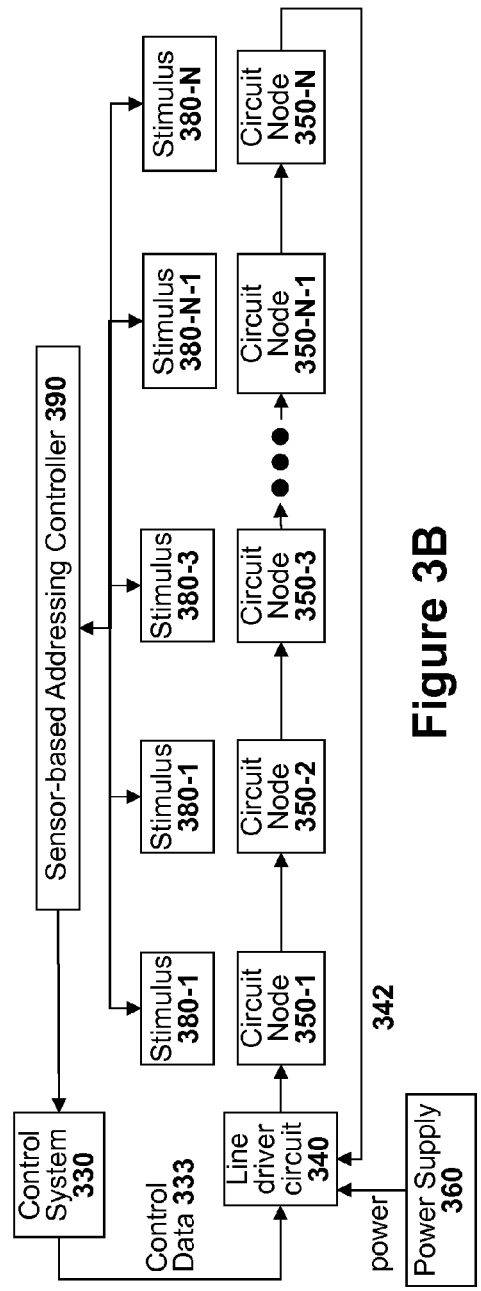
Figure 3A
Figure 3B

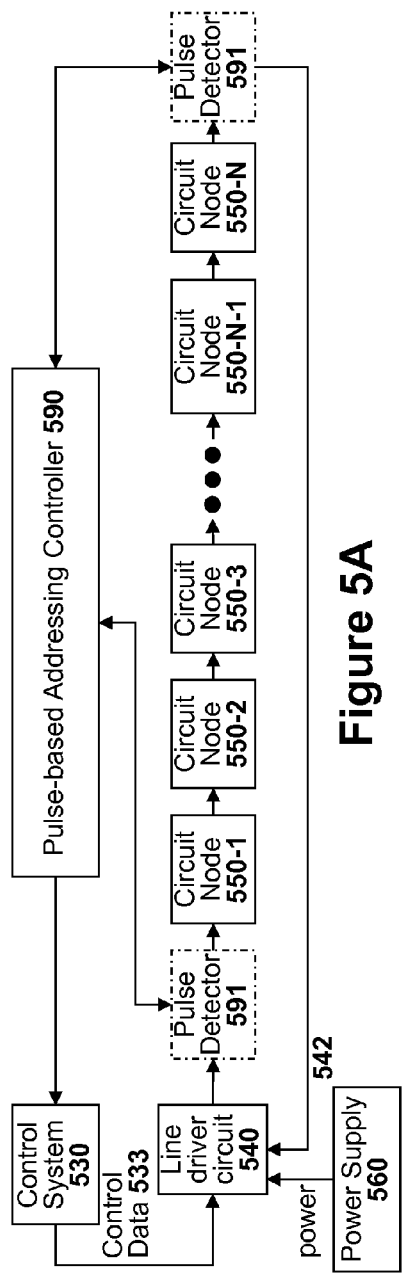
Figure 5A
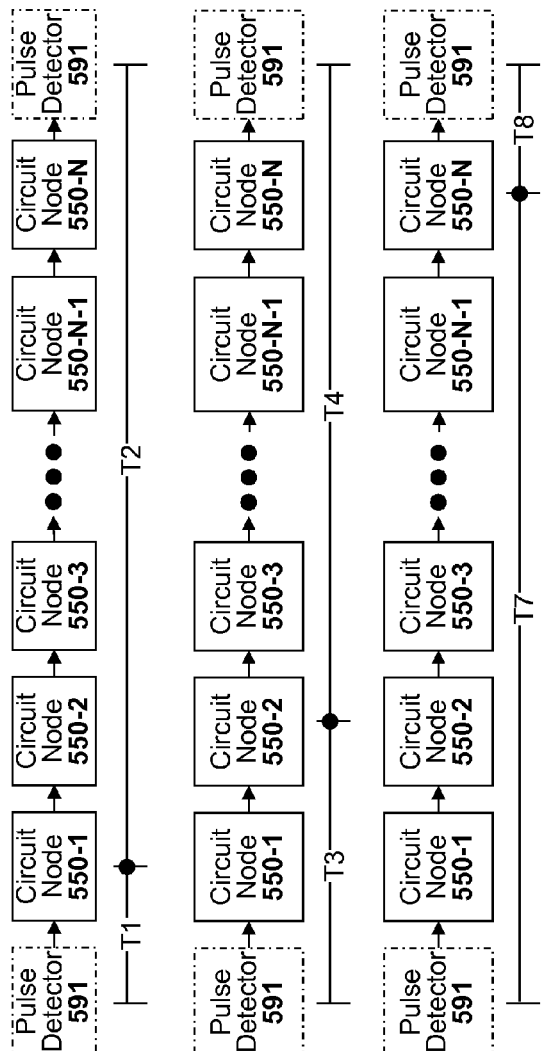
Figure 5B
Figure 5C
Figure 5D

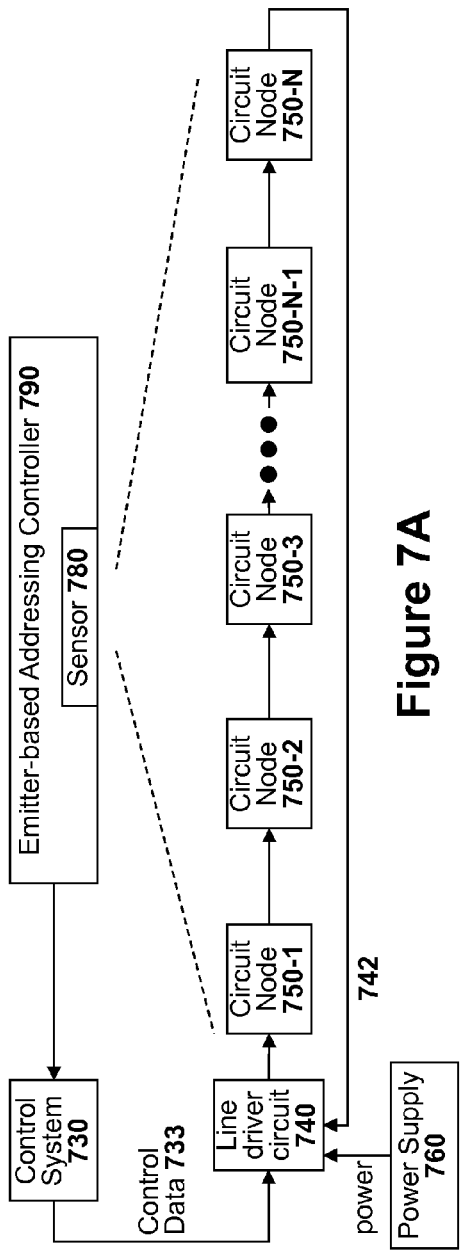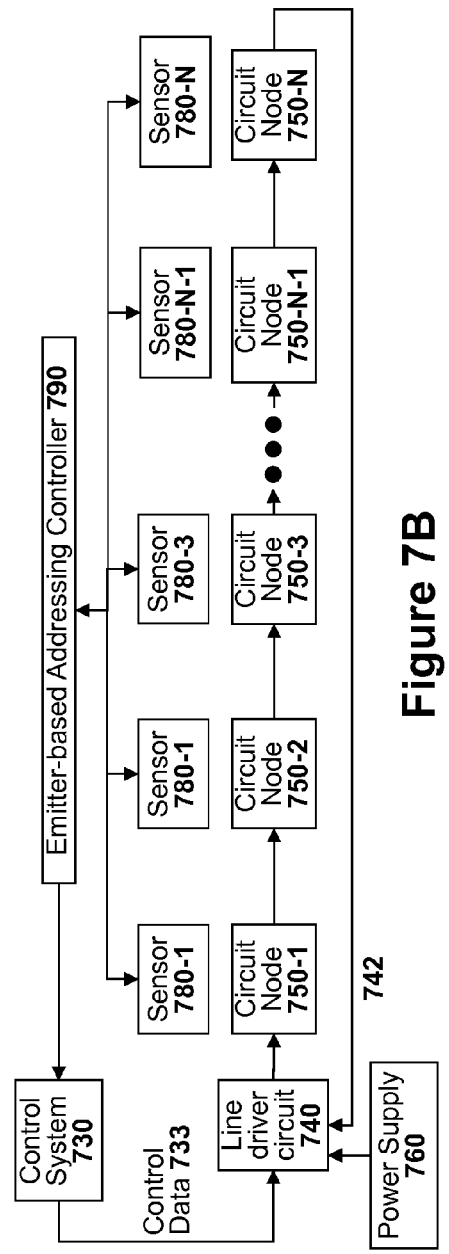

SYSTEMS AND METHODS FOR ASSIGNING ADDRESSES TO SERIALLY ARRANGED CIRCUIT NODES

TECHNICAL FIELD

The present invention relates to the field of serial electronic circuit systems. In particular, but not by way of limitation, the present invention discloses techniques for assigning addresses to individual electronic circuit nodes in a system with multiple electronic circuit nodes.

BACKGROUND

Electrical circuits are often wired in a parallel manner wherein individual circuit nodes each have their own parallel power and ground electrical lines. For example, the various lighting circuits in a typical household are wired in parallel to each other. Parallel electrical wiring allows for individual control of each different parallel electrical circuit. Thus, each electric light in a household can be individually controlled by turning on or off the light switch that controls the associated light.

However, parallel wiring of individual circuit nodes has some disadvantages. For example, parallel wiring requires a greater amount of physical wiring to operate the same number of circuit nodes since each individual parallel circuit requires its own dedicated parallel physical wiring. This additional physical wiring burden of parallel circuits increases the overall cost of the system since more physical wiring conductor material and wiring insulation material is required to construct a parallel system instead of a serial system. Additional labor is also generally required to install all the different individual parallel wired circuit branches. Furthermore, a parallel wired system will often consume more energy since there will be greater conductor losses in the system.

To reduce the amount of physical wiring required, the individual circuit nodes in a multiple circuit-node system may be arranged in a serial configuration. Alternatively, the individual circuit nodes may be coupled to a common bus wherein the multiple different individual circuit nodes all access a shared set of conductors that make up the common bus. In a serial configuration or a common bus configuration, it is difficult to individually access the different individual circuit nodes. Thus, when arranged in a serial configuration or a common bus configuration the individual circuit nodes are often assigned unique addresses such that each individual circuit node can be communicated to individually using the circuit node's unique address. For example, many digital networked devices are assigned a globally unique media access control address (MAC address) for use on the digital network interface. The existence of a globally unique MAC address for each digital network interface allows a networked device to be added to any compatible digital network and immediately be recognized as a new unique device on the digital network.

Assigning a globally unique MAC address to every individual network device is not a simple process. In order for all of the MAC addresses to be globally unique, an industry organization must maintain an addressing system for ensuring that all of the network devices are assigned globally unique addresses. For example, the Institute of Electrical and Electronics Engineers (IEEE) manages three different types of MAC addresses according to the rules of three address numbering name spaces. Every vendor that builds a network product designed to include a MAC address must register with the IEEE, obtain a set of MAC addresses, and ensure that every unique network product that the vendor manufactures includes a uniquely assigned MAC address from the set of MAC addresses received from the IEEE. Thus, every network product manufactured that includes a MAC address will not be identical (due to the need of a unique MAC address) and this complicates the manufacturing process. Specifically, the manufacturing process must include steps for assigning a unique MAC address to each different network product that is manufactured.

Having a unique address is necessary in order to identify different individual circuit nodes organized in a serial configuration or a common bus configuration. However, the task of assigning unique addresses to mass-manufactured electronic products complicates manufacturing process since each individual electronic product will not be identical. Therefore, it would be desirable to improve the techniques for assigning unique addresses to mass-manufactured electronic products.

BRIEF DESCRIPTION OF THE DRAWINGS

In the drawings, which are not necessarily drawn to scale, like numerals describe substantially similar components throughout the several views. Like numerals having different letter suffixes represent different instances of substantially similar components. The drawings illustrate generally, by way of example, but not by way of limitation, various embodiments discussed in the present document.

FIG. 3A illustrates a first stimulus based addressing system wherein a stimulus-based addressing controller controls a moving stimulus device to stimulate each circuit-node.

FIG. 3B illustrates an alternate stimulus based addressing system that uses an individual stimulus device to stimulate each individual circuit-node.

FIG. 5A illustrates a pulsed based system for assigning unique addresses to circuit-nodes arranged on a serial line.

FIG. 5B conceptually illustrates a first circuit-node emitting a pulse that is detected by the two pulse detectors at the ends of the serial line.

FIG. 5C conceptually illustrates a second circuit-node emitting a pulse that is detected by the two pulse detectors at the ends of the serial line.

FIG. 5D conceptually illustrates a last circuit-node emitting a pulse that is detected by the two pulse detectors at the ends of the serial line.

FIG. 7A illustrates a single sensor emitter-based system for assigning unique addresses to circuit-nodes arranged on a serial line.

FIG. 7B illustrates a multiple-sensor emitter-based system for assigning unique addresses to circuit-nodes arranged on a serial line.

DETAILED DESCRIPTION

The following detailed description includes references to the accompanying drawings, which form a part of the detailed description. The drawings show illustrations in accordance with example embodiments. These embodiments, which are also referred to herein as "examples," are described in enough detail to enable those skilled in the art to practice the invention. It will be apparent to one skilled in the art that specific details in the example embodiments are not required in order to practice the present invention. For example, although some example embodiments are disclosed with reference to circuits that drive both power and control data on the same line, the teachings of this disclosure may be used to only supply power to serially arranged circuit systems. The example embodiments may be combined, other embodiments may be utilized, or structural, logical and electrical changes may be made without departing from the scope what is claimed. The following detailed description is, therefore, not to be taken in a limiting sense, and the scope is defined by the appended claims and their equivalents.

In this document, the terms "a" or "an" are used, as is common in patent documents, to include one or more than one. In this document, the term "or" is used to refer to a nonexclusive or, such that "A or B" includes "A but not B," "B but not A," and "A and B," unless otherwise indicated. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

Computer Systems

Figure 1:
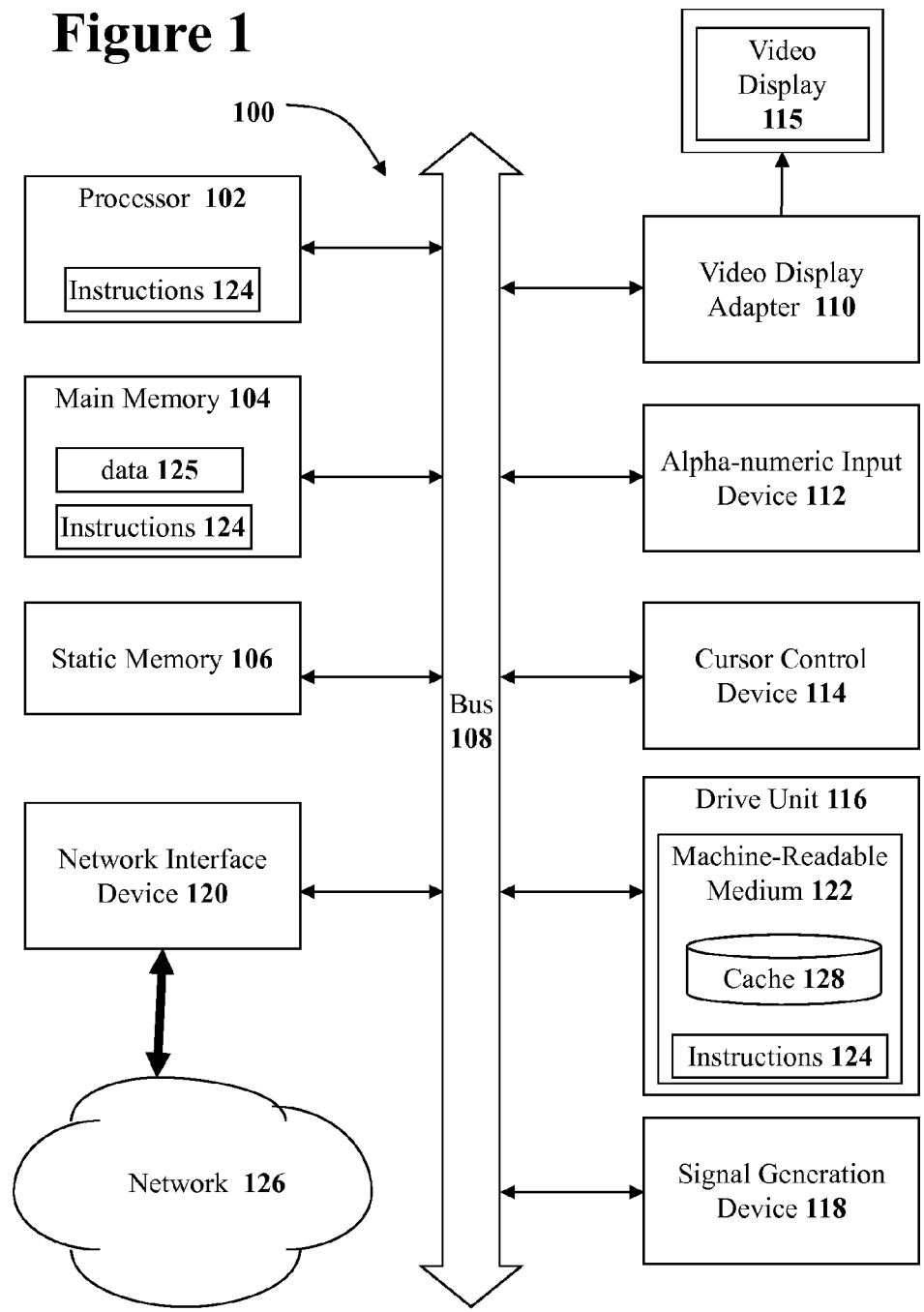
FIG. 1 illustrates a diagrammatic representation of a machine in the example form of a computer system within which a set of instructions, for causing the machine to perform any one or more of the methodologies discussed herein, may be executed.

Some embodiments of the present disclosure may use computer systems since computer systems are very often used to control electrical circuit systems. FIG. 1 illustrates a diagrammatic representation of a machine in the example form of a computer system 100 that may be used to implement portions of the present disclosure. Within computer system 100 there are a set of instructions 124 that may be executed for causing the machine to perform any one or more of the methodologies discussed herein. In a networked deployment, the machine may operate in the capacity of a server machine or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of computer instructions (sequential or otherwise) that specify actions to be taken by that machine. Furthermore, while only a single machine is illustrated, the term "machine" shall also be taken to include any collection of machines that individually or jointly execute a set (or multiple sets) of instructions to perform any one or more of the methodologies discussed herein.

The example computer system 100 includes a processor 102 (e.g., a central processing unit (CPU), a graphics processing unit (GPU) or both), a main memory 104 and a static memory 106, which communicate with each other via a bus 108. The computer system 100 may further include a video display adapter 110 that drives a video display system 115 such as a Liquid Crystal Display (LCD) or a Cathode Ray Tube (CRT). The computer system 100 also includes an alphanumeric input device 112 (e.g., a keyboard), a cursor control device 114 (e.g., a mouse or trackball), a disk drive unit 116, an output signal generation device 118, and a network interface device 120.

The disk drive unit 116 includes a machine-readable medium 122 on which is stored one or more sets of computer instructions and data structures (e.g., instructions 124 also known as 'software') embodying or utilized by any one or more of the methodologies or functions described herein. The instructions 124 may also reside, completely or at least partially, within the main memory 104 and/or within the processor 102 during execution thereof by the computer system 100, the main memory 104 and the processor 102 also constituting machine-readable media. Note that the example computer system 100 illustrates only one possible example and that other computers may not have all of the components illustrated in FIG. 1

The instructions 124 may further be transmitted or received over a computer network 126 via the network interface device 120. Such transmissions may occur utilizing any one of a number of well-known transfer protocols such as the File Transport Protocol (FTP).

While the machine-readable medium 122 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies described herein, or that is capable of storing, encoding or carrying data structures utilized by or associated with such a set of instructions. The term "machine-readable medium" shall accordingly be taken to include, but not be limited to, solid-state memories, optical media, and magnetic media.

For the purposes of this specification, the term "module" includes an identifiable portion of code, computational or executable instructions, data, or computational object to achieve a particular function, operation, processing, or procedure. A module need not be implemented in software; a module may be implemented in software, hardware/circuitry, or a combination of software and hardware.

In the present disclosure, a computer system may comprise a very small microcontroller system. A microcontroller may comprise a single integrated circuit that contains the four main components that create a computer system: an arithmetic and logic unit (ALU), a control unit, a memory system, and an input and output system (collectively termed I/O). Microcontrollers are very small and inexpensive integrated circuits that are very often used within digital electronic devices. A microcontroller may be integrated along with other functions to create a system on a chip (SOC).

Individual Control, Bus Systems, and Serial Control

Figure 2A:
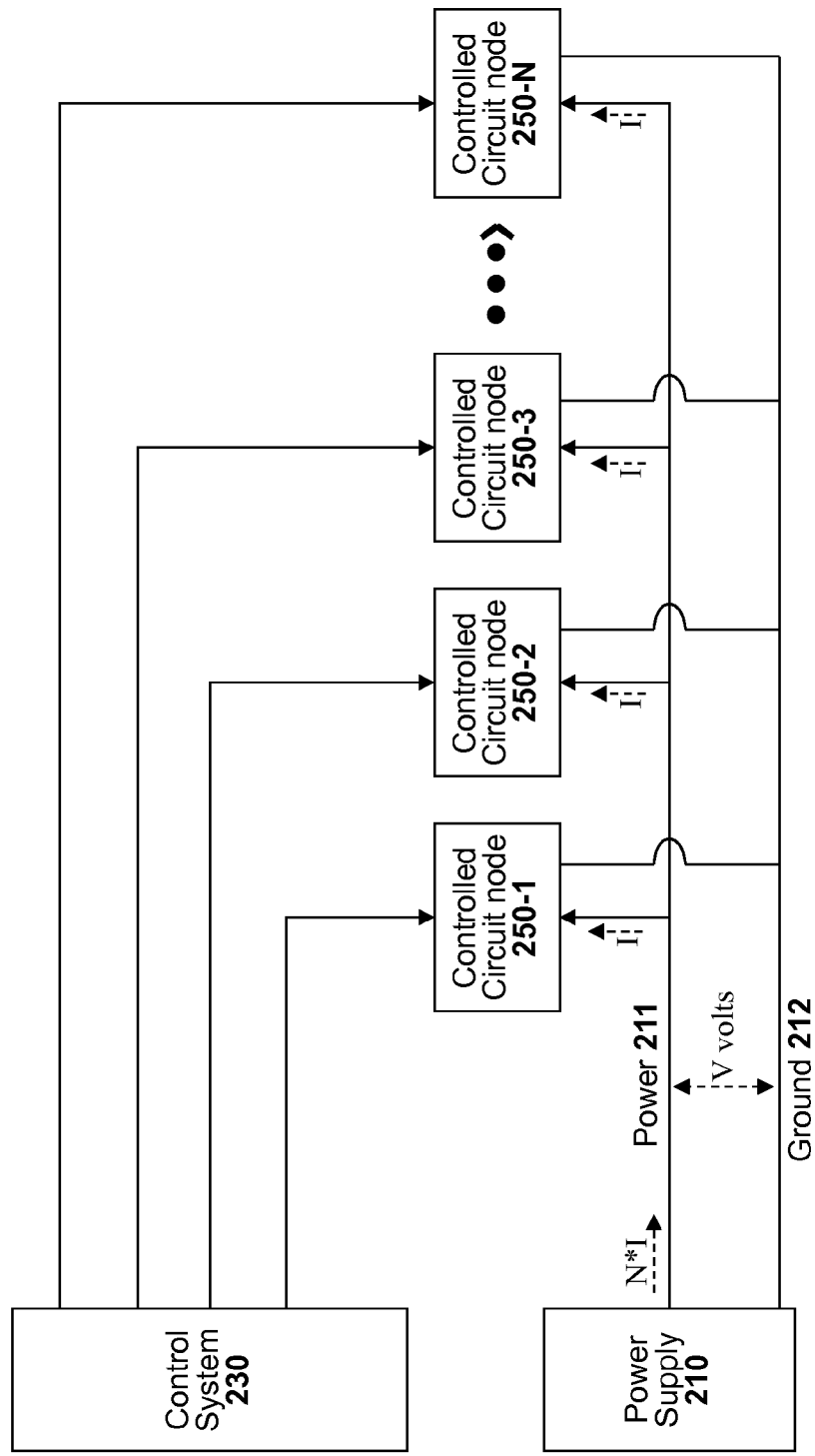
FIG. 2A illustrates a block diagram of parallel-wired circuit-nodes with parallel control wires for each circuit-node.

FIG. 2A illustrates a set of controlled electrical circuit-nodes 250-1 to 250-N that are wired in parallel to receive electrical power, electrical ground, and control signals. The individual controlled electrical circuit-nodes 250-1 to 250-N may perform any of a number of different useful functions such as outputting light, outputting sound, driving an electric motor, etc. For the purposes of this document, the specific functional application performed by the individually controlled electrical circuit-nodes 250-1 to 250-N does not matter.

In the parallel wired arrangement of FIG. 2A each of the individually controlled circuit-nodes 250-1 to 250-N receives electrical power using electrical power conductor 211 and ground conductor 212. The electrical power conductor 211 provides V volts of potential relative to the electrical ground 212 and each of the individually controlled circuit-nodes 250-1 to 250-N consumes I Amps of current such that N*I Amps of current is provided by power supply 210.

In addition each of the controlled circuit-nodes 250-1 to 250-N receives control information from a control system 230 using individual parallel control lines coupled to each of the controlled circuit-nodes 250-1 to 250-N. In this manner, the control system 230 can individually control each of the circuit-nodes 250-1 to 250-N by using the associated control line. The parallel wiring arrangement depicted in FIG. 2A has some advantages over serially wired arrangements. For example, each of the controlled circuit-nodes 250-1 to 250-N is independent from all the other controlled circuit-nodes 250-1 to 250-N such that if one of the controlled circuit-nodes 250-1 to 250-N experiences a local failure, none of the other controlled circuit-nodes 250-1 to 250-N will likely be affected. Furthermore, the individual control lines from control system 230 to the individual controlled circuit-nodes 250-1 to 250-N are not shared such each controlled circuit-node can use the full bandwidth of the dedicated control line.

However, the robustness of system that employs parallel wiring comes at a cost. All of the controlled circuit-nodes 250-1 to 250-N must be individually wired such that there are at least three different conductors that must be coupled to each and every one of the individually controlled circuit-nodes 250-1 to 250-N. In particular, the system of FIG. 2A uses an individual control line for each one of the controlled circuit-nodes 250-1 to 250-N in addition to power and ground conductors. This individual wiring increases the cost and complexity of the system.

Figure 2B:
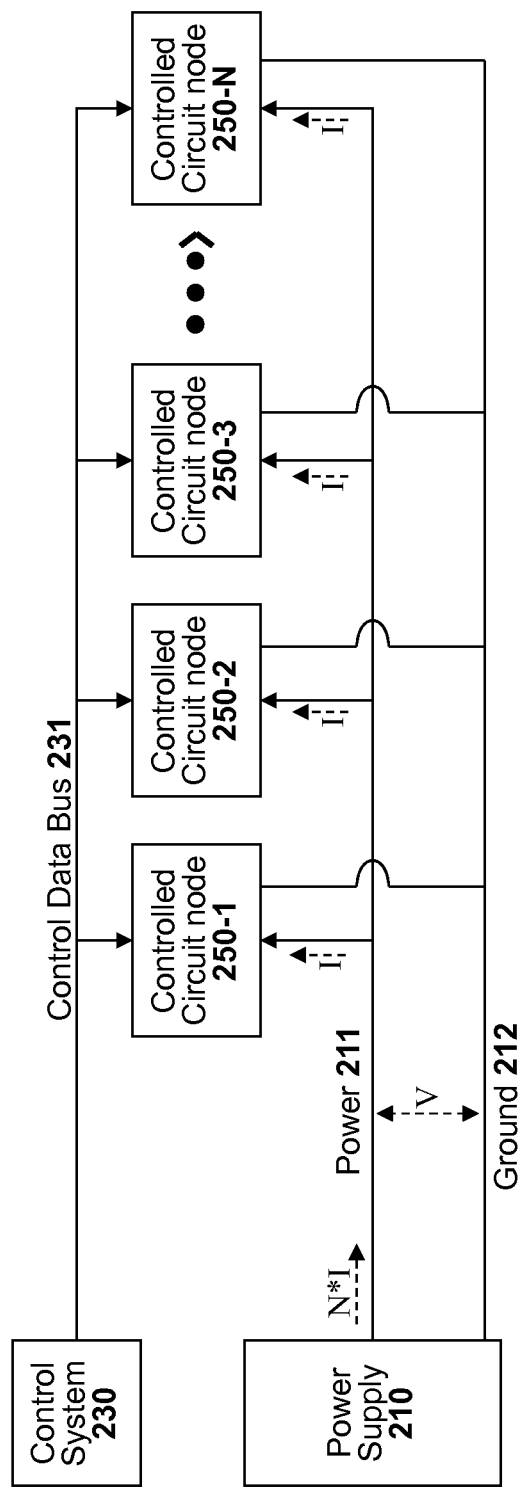
FIG. 2B illustrates a block diagram of parallel-wired circuit-nodes with a common bus for control of the circuit-nodes.

To reduce the wiring complexity of the parallel wired arrangement of FIG. 2A, a bus based control system may be used instead of individual parallel control wires. FIG. 2B illustrates a bus-based control system for the controlled circuit-nodes 250-1 to 250-N. In the bus-based control system of FIG. 2B all of the controlled circuit-nodes 250-1 to 250-N are coupled to a common control data bus 231. In order to send a command to a specific individual controlled circuit node of the controlled circuit-nodes 250-1 to 250-N the control system 230 must somehow specify a unique address for that desired specific individual controlled circuit node. Thus, all of the controlled circuit-nodes 250-1 to 250-N must each have a locally unique address.

Figure 2C:
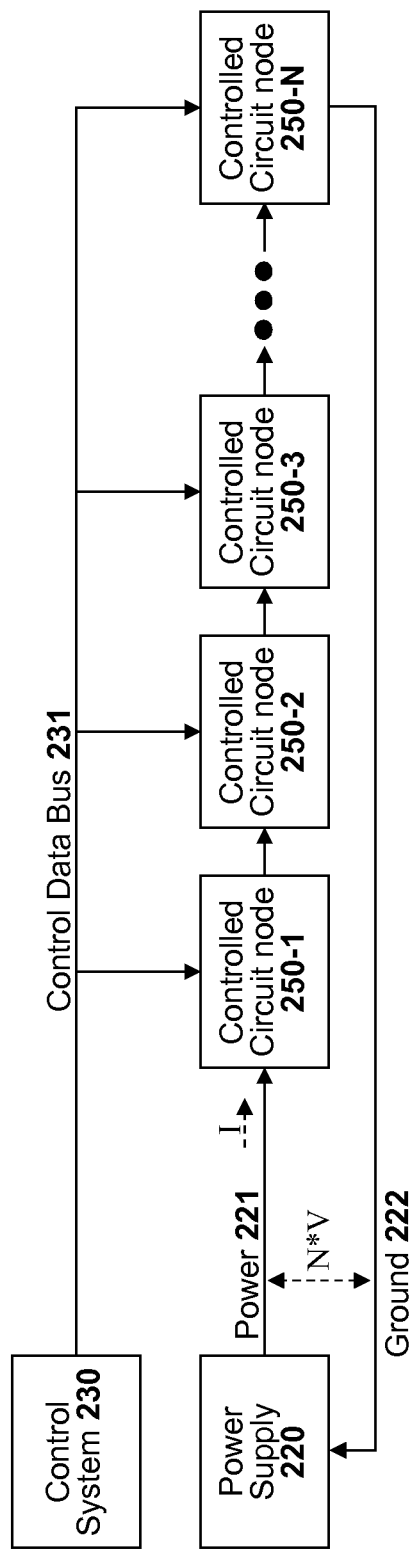
FIG. 2C illustrates a block diagram of serially wired circuit-nodes with a common bus for control of the circuit-nodes.

The bus-based control system from FIG. 2B may also be used in a system that uses a serial power distribution arrangement. FIG. 2C illustrates a set of controlled circuit-nodes 250-1 to 250-N with a serial power arrangement wherein each of the controlled circuit-nodes 250-1 to 250-N are coupled together in a daisy-chain manner with a single power line 221 that provides electrical power to all of the controlled circuit-nodes 250-1 to 250-N. Although the system of FIG. 2C uses a serial power arrangement, a common control data bus 231 is used to send control commands to the controlled circuit-nodes 250-1 to 250-N such that each of the controlled circuit-nodes 250-1 to 250-N requires a unique address.

Figure 2D:
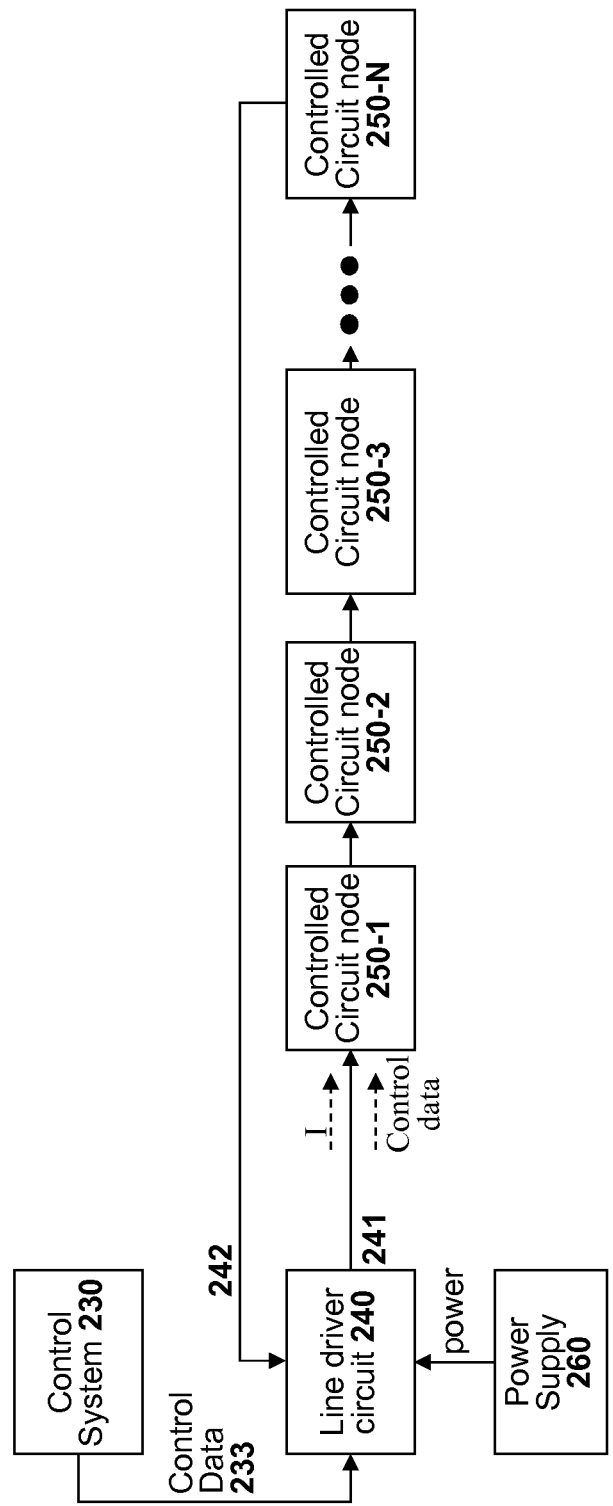
FIG. 2D illustrates a block diagram of serially wired circuit-nodes wherein both control data and power are transmitted on the same serial line.

A recent circuit innovation allows a control system to transmit control data down the serial power line 221 of the serial arrangement of FIG. 2C. Specifically, FIG. 2D illustrates an advanced serial circuit arrangement wherein the control system 230 may provide control information 233 to a line driver circuit 240 that modulates the control information onto the current I from power supply 260 driven down the serial power line 241. The individual circuit-nodes 250-1 to 250-N demodulate and use the control information. In this manner, only a single conductor power line 241 is needed to wire together all of the controlled circuit-nodes 250-1 to 250-N. Details on how to implement such a single conductor power and control system can be found in the U.S. Pat. No. 8,344,659 entitled "System and method for lighting power and control system" granted on Jan. 1, 2013 which is hereby incorporated by reference in its entirety. As with the bus-based circuit systems of FIGS. 2B and 2C, the system of FIG. 2D requires that each of the individual circuit-nodes 250-1 to 250-N have a unique address in order to be able to individually control each of the circuit-nodes 250-1 to 250-N.

Providing Unique Addresses to Circuits

As set forth with reference to FIGS. 2B to 2D, to efficiently control individual circuit-nodes in a multi-circuit-node system one must generally assign unique addresses to each of the individual circuit-nodes. However, to most efficiently manufacture electronic circuit devices, each electronic circuit device is typically identical such that mass manufacturing techniques must be used. Thus, assigning a unique address requires adding an additional manufacturing step for each individual circuit node manufactured.

In addition to requiring an additional manufacturing step, assigning addresses to individual circuit elements can create an inventory control problem. For example, with the multi-circuit-node systems of FIGS. 2B to 2D each multi-circuit-node systems may have a large number of individual circuit-nodes. If there are 200 circuit-nodes in a multi-circuit-node system and each individual circuit-node receives an address from 1 to 200 then there will be 200 different addressed circuit-node parts that must be kept in an inventory system. Each of these 200 different addressed circuit-node parts may visually appear identical but must be carefully kept track of in order to ensure the proper addressed circuit-node part is used.

To prevent the necessity of such a complex inventory control program, one may prefer to work with unaddressed circuit-node parts. These unaddressed circuit-node parts will be identical such that only one type of circuit-node part needs to be created and used. However, after assembling the unaddressed circuit-node parts into a multi-circuit-node system such as the multi-circuit-node systems of FIGS. 2B to 2D, the unaddressed circuit-node parts must then each be assigned locally unique addresses in order to individually control each circuit-node. The present document discloses several methods of assigning unique addresses to unaddressed circuit-node parts that have been assembled into a multi-circuit-node system.

Sensor Based Addressing Systems

A first method of assigning unique addresses to the controlled circuit-nodes 250-1 to 250-N in FIGS. 2B to 2D is to use a sensor-based addressing system. A sensor-based addressing system may be created in many different manners. However, common to most sensor-based addressing systems is the fact that the control system 230 is able to send broadcast messages to all of the controlled circuit-nodes 250-1 to 250-N and each of the controlled circuit-nodes 250-1 to 250-N has some type of sensor for sensing an external input.

The type of sensor may vary based upon the implementation. Various different implementations of the sensor-based addressing system use various different sensor circuits. Ideally, the sensor circuit should be inexpensive to implement within an integrated circuit. In one embodiment, a photo-sensor circuit is used. A photo-sensor circuit is useful since it can easily be implemented in an integrated circuit and may also be useful to the multi-circuit-node system in its normal operation mode. In another implementation, a Hall-Effect sensor is used that can detect magnetic fields. An RF sensor may also be used. In another sensor-based addressing system embodiment, a temperature sensor is used. The temperature sensor may also be used during normal operation of the circuit-node to ensure that the circuit-node is not over-heating. Note that this list is just a set of sensor examples and other sensors may also be used.

The multi-circuit-node system may be in many different physical forms such as a long string of individual circuit-nodes coupled together by wiring, a panel having several different circuit-nodes mounted onto it, a physical product having several different circuit-nodes located at different points on the physical product, etc. The sensor-based addressing system must be able to expose each of the different circuit-nodes to some type of external stimulus that can be sensed by the circuit-nodes.

Various different techniques may be used to expose each of the circuit-nodes to stimulus. FIG. 3A illustrates a first system wherein a sensor-based addressing controller 390 controls a moving stimulus device 380A that is stimulating a first circuit-node 350-1. After completing operations on the first circuit-node 350-1, the stimulus device can be moved as illustrated by stimulus device 380B stimulating a circuit-node 350-2. The same effect can be achieved by moving the multi-circuit-node system around a fixed stimulus device (not shown). FIG. 3B illustrates an alternate sensor-based addressing system that uses an individual stimulus device (380-1 to 380-N) to stimulate each individual circuit-node (350-1 to 350-N) by selectively activating each individual stimulus device (380-1 to 380-N) as needed.

Figure 4:
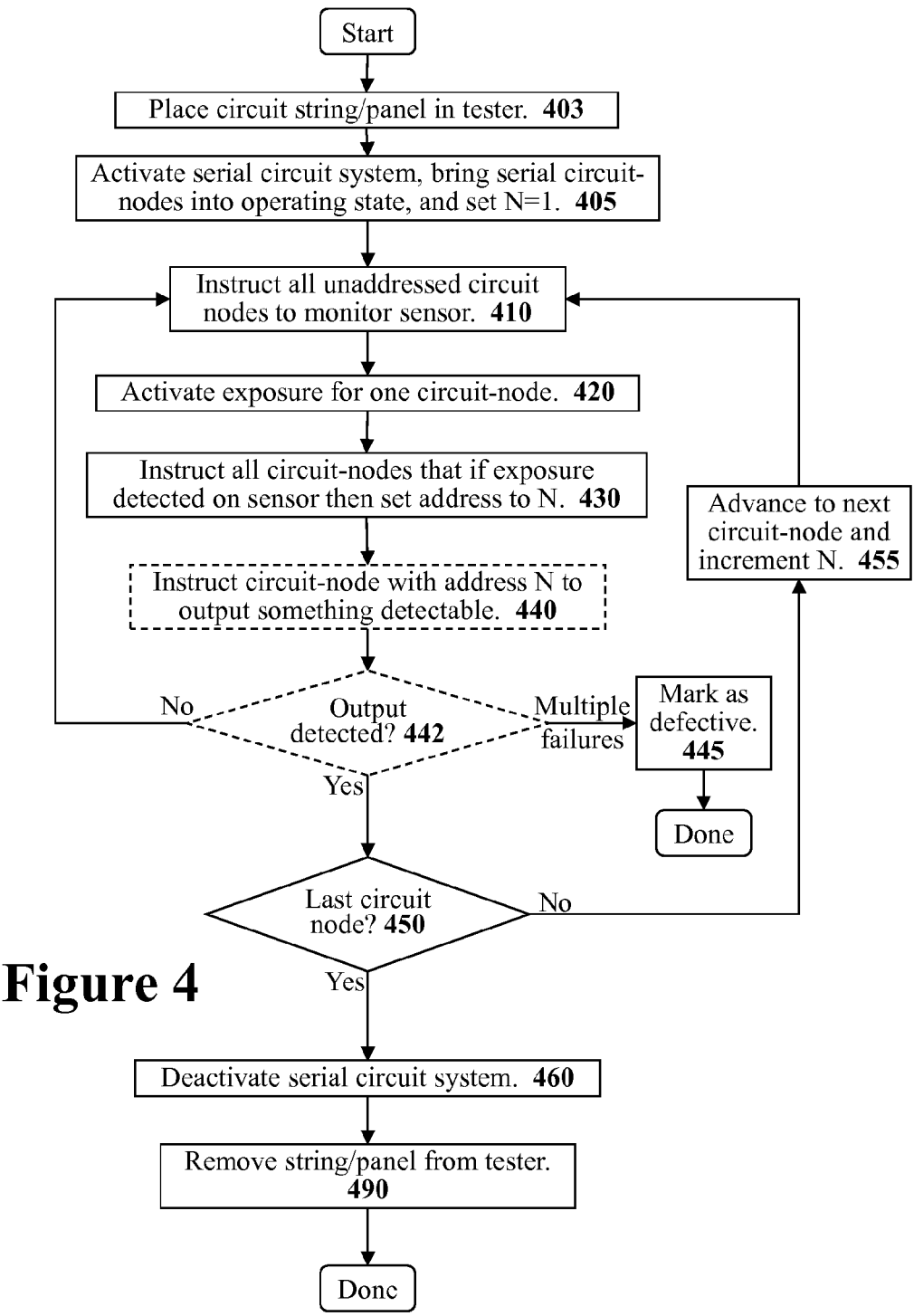
FIG. 4 illustrates a flow diagram that describes the overall operation of a sensor-based addressing system.

FIG. 4 illustrates a flow diagram that describes the overall operation of a sensor-based addressing system. Various implementation details of different versions of sensor-based addressing systems will be set forth while describing the sensor-based addressing system of FIG. 4. The sensor-based addressing system of FIG. 4 is designed to assign unique addresses to each of the controlled circuit-nodes 250-1 to 250-N assembled into the multi-circuit-node systems illustrated in FIGS. 2B to 2D. Referring to stage 403, the multi-circuit-node system is placed into the sensor-based addressing system.

After placing the multi-circuit-node system into the sensor-based addressing system, the system then activates the multi-circuit-node system at stage 405 and brings the circuit-nodes into an active state. An addressing counter is also set to an initial state which is described as N=1 in this example.

The sensor-based addressing system then enters a loop at stage 410 to start addressing all of the individual circuit-nodes in the multi-circuit-node system. The first step of the loop is to have the control system instruct each the unaddressed circuit-nodes to monitor the external sensor circuit.

Next, at stage 420, the sensor-based addressing system then activates a stimulus system to expose one of the circuit-nodes to the type of phenomenon that the sensor circuit detects. For a photo-sensor based system, this may simply be shining light onto one circuit-node. For hall-effect sensor, a magnetic field may be presented to one circuit-node. For an RF sensor, the proper RF signal may be transmitted to a circuit-node. For a temperature sensor, some heat may be applied to the circuit-node. At this point, one circuit-node on the multi-circuit-node system should be able to detect the stimulus using its sensor circuit.

At stage 430, the control system instructs the unaddressed circuit-node that is receiving external stimulus to assign address N to itself. The unaddressed circuit-node receiving the external stimulus assigns itself the address N by writing the address N to some non-volatile memory system (such as flash memory), burning a pattern in a set of fuses, or otherwise recording the address in a manner that can be recalled. Since only one unaddressed circuit-node is being exposed to the external stimulus then only that one unaddressed circuit-node should be assigned address N. Furthermore, the sensor-based addressing system is informed as to exactly which circuit-node is now being assigned address N since the sensor-based addressing system is controlling the circuit-node that is being exposed to the external stimulus.

In some embodiments, the sensor-based addressing system may then perform an optional test to ensure that the address was properly assigned. Specifically, at stage 440, the control system may instruct the circuit node with address N to output something detectable by the sensor-based addressing system. For example, the circuit-node may turn on a local LED light or activate any other type of output. Then at stage 442, the sensor-based addressing system attempts to detect the LED or other output. If no output is detected, the system may proceed back to stage 410 to attempt to assign an address to the circuit-node again. If there have been multiple failures to assign an address to this circuit-node then they system may proceed to stage 445 where this multi-circuit-node system is marked as defective. But if the output is successfully detected, the system proceeds to along to stage 450 to work on the next circuit-node in the multi-circuit-node system.

At stage 450, the sensor-based addressing system determines whether this was the last circuit node in the multi-circuit-node system. If this was not the last circuit node in the multi-circuit-node system then the sensor-based addressing system increments the address counter N and advances to the next circuit node in the multi-circuit-node system at stage 455. Advancing to the next circuit node in the multi-circuit-node system may be performed in many different ways depending on the sensor-based addressing system. For example, the sensor-based addressing system may physically move the multi-circuit-node system in manner such that the next circuit-node is placed into a stimulus station, the sensor-based addressing system may physically move a stimulus device to the next circuit-node, or next stimulus station of many stimulus stations may be activated. The sensor-based addressing system then proceeds through stages 410, 420, and 430 to assign an address for that next unaddressed circuit-node.

Referring back to stage 450, after the last circuit-node the sensor-based addressing system proceeds to stage 460. At this point all of the individual circuit-nodes in the multi-circuit-node system should have unique addresses. In some embodiments, some final testing may be performed at this stage. The sensor-based addressing system deactivates the multi-circuit-node system at stage 460. Finally, the multi-circuit-node system is removed from the sensor-based addressing system at stage 490.

A Pulse Based Addressing Systems

The sensor-based addressing system of the previous section works well to provide unique addresses to individual circuit-nodes but it requires sensor circuits in each circuit-node. Furthermore, the addressing system requires that each circuit-node be moved to a stimulation station or a stimulation system be moved to each of the circuit-nodes. Thus, other types of addressing systems are desirable if the sensor-based addressing system is not practical for a particular product.

FIG. 5A illustrates a block diagram for a different system of assigning unique local addresses to the controlled circuit-nodes 550-1 to 550-N in a serial arrangement. Specifically, FIG. 5A illustrates a pulsed based system for assigning unique addresses to the serially arranged circuit-nodes 550-1 to 550-N. In the system of FIG. 5A, each of circuit-nodes 550-1 to 550-N individually emits an electrical pulse that travels long common serial line and the timing of when the pulse is received can be used to determine the location of a circuit-node. In some embodiments the relative time from when the pulse is requested until when the pulse is detected at the ends of the common serial line can be used to determine the location of the circuit-node. However, often it isn't easy to control exactly when the system will send the pulse so the relative difference in pulse receive times may be used to determine the position of a circuit-node.

Although the system illustrated in FIG. 5A places the detectors at the end of the line, a pulse based system could have detectors at locations other than the end. This may be required for long strings wherein the pulse signals may not fully propagate the length of the string with sufficient strength to be accurately detected. Alternatively, a string may wrap back on itself such that there is no "end" of the string. But the same principle of using the relative differences in pulse receive times may be used to determine location.

FIG. 5A illustrates the same serially arranged controlled circuit-nodes 550-1 to 550-N as illustrated in FIG. 2D. The serially arranged controlled circuit-nodes 550-1 to 550-N are supported by a similar control system 530, line driver circuit 540, and power supply 560. In addition, the serially arranged system of FIG. 5A has a pulse-based addressing controller 590 that is used to control the serial string of circuit-nodes 550-1 to 550-N. In some embodiments, the pulse-based addressing controller 590 may be combined with the control system 530. The pulse-based addressing controller 590 is supplemented by pulse detectors 591 and 592 that will be used to detect pulses emitted by circuit-nodes.

The pulse detectors 591 and 592 may be implemented in various different manners depending on the embodiment. In many embodiments, the pulse detectors 591 and 592 are directly in the serial conductor path. However, in other embodiments the pulse detectors may be implemented with inductive detectors such that a direct electrical connection may not be required. The pulse detectors are designed to detect pulses emitted by the controlled circuit-nodes 550-1 to 550-N onto the serial line. Since the pulse detectors 591 and 592 are only required at the manufacturing facility, these may be expensive highly-sensitive pieces of electrical equipment.

The pulse-based addressing system of FIG. 5A operates by having the individual circuit-nodes 550-1 to 550-N emit a pulse that may be timed from when the pulse is emitted to when the pulse is received by the two pulse detectors 591 and 592 at either end of the serial line. For example, FIG. 5B conceptually illustrates circuit-node 550-1 emitting a pulse that is detected by the two pulse detectors 591 and 592 at two ends of the serial line. Pulse detector 591 receives the pulse after time period T1 and pulse detector 592 receives the pulse after time period T2. Since time period T1 is much shorter than time T2, circuit-node 550-1 is obviously much closer to pulse detector 591.

FIG. 5C conceptually illustrates an example of circuit-node 550-2 emitting a pulse wherein time T3 depicts the time from when a pulse emitted by circuit-node 550-2 is received by pulse detector 591 and time T4 depicts the time from when the pulse emitted by circuit-node 550-2 is received by pulse detector 592. Note that since circuit-node 550-2 is to the right of circuit-node 550-1, the time T3 is longer than time T1 and time T4 is shorter than time T2. All of the pulse time periods from the different circuit-nodes will be different. FIG. 5D illustrates the right-most circuit-node 550-N emitting a pulse wherein the time T7 to pulse detector 591 is long and the time T8 to pulse detector 592 is short.

By measuring pulse receive times from all of the individual circuit-nodes 550-1 to 550-N, the pulse-based addressing system pulse-based addressing controller 590 can identify the relative location of all the different individual circuit-nodes 550-1 to 550-N. Note that extremely accurate timing measurements are not required. For example, as long as T1 is smaller than T3 and T2 is larger than T4, the system can easily determine the relative position of adjacent circuit-nodes 550-1 and 550-2.

Figure 6:
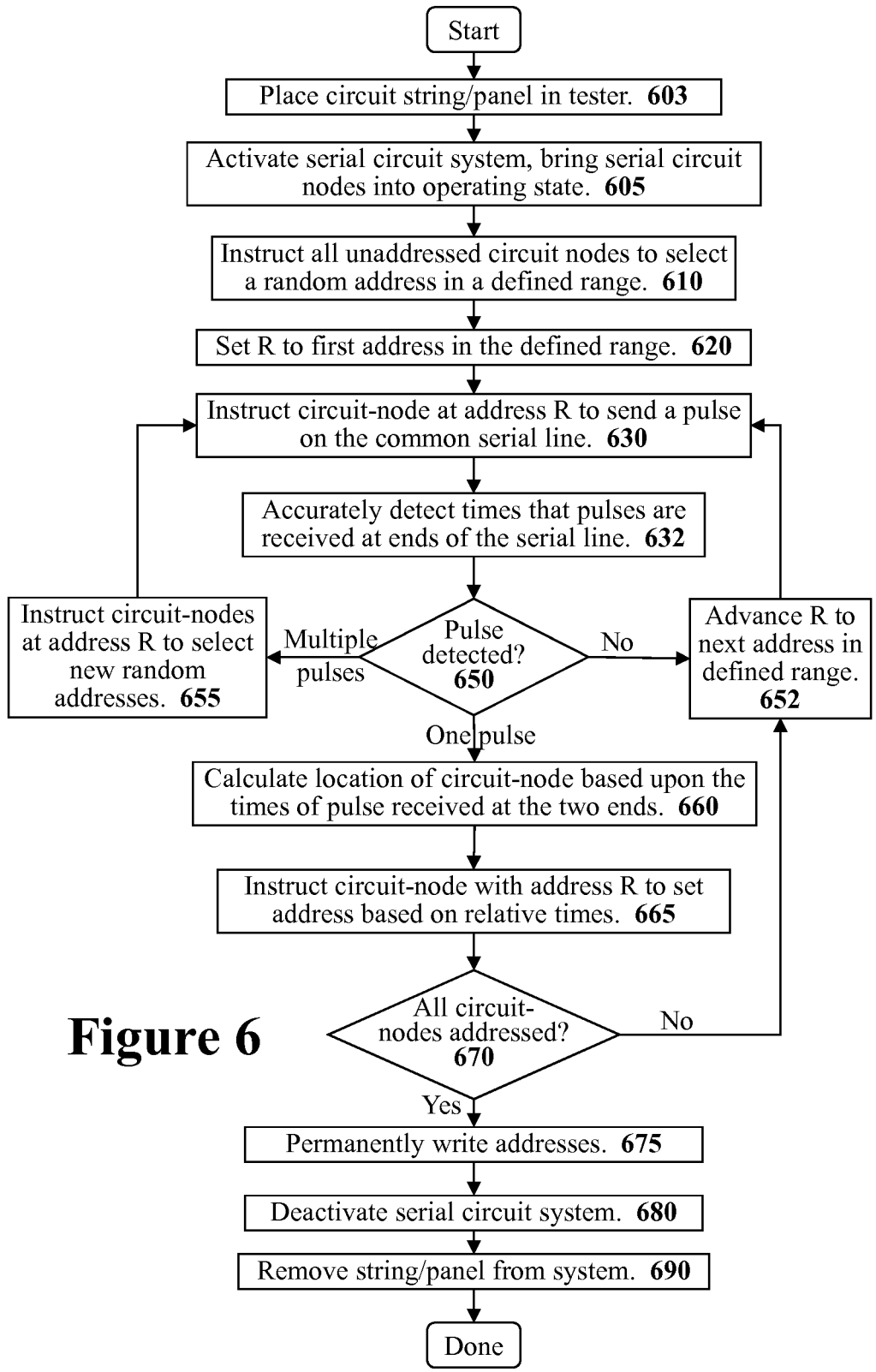
FIG. 6 illustrates one embodiment of a flow diagram describing how the pulse-based addressing system illustrated in FIG. 5A may be used to assign unique addresses to the individual circuit-nodes arranged in a series.

FIG. 6 illustrates one embodiment of a flow diagram describing how the pulse-based addressing system illustrated in FIG. 5A may be used to assign unique addresses to the individual circuit-nodes arranged in a series. Referring to stage 603, the multi-circuit-node system is placed into the pulse-based addressing system. As illustrated in FIG. 5A, the pulse-based addressing system has two pulse detectors 591 and 592 designed to detect signal pulses emitted by any of the circuit-nodes 550-1 to 550-N. After placing the multi-circuit-node system into the pulse-based addressing system, the system then activates the multi-circuit-node system at stage 605 and brings the serial circuit-nodes into an active state.

At stage 610, the pulse-based addressing system instructs all of the unaddressed circuit-nodes to select a random address in a defined range of addresses. Many methods of generating random (or pseudorandom) numbers within integrated circuits are well known in the art. Ideally, each individual circuit-node will be assigned a unique random address. However, when more than one circuit-node is randomly assigned the same address this address collision will be detected. Next, at stage 620, the pulse-based addressing system sets a variable R to the first address in the defined address range of the random addresses.

The pulse-based addressing system then enters a loop starting at stage 630 to assign addresses to all of the individual circuit-nodes 550-1 to 550-N in the multi-circuit-node system. The loop may proceed through the address space from which random addresses were selected. In the embodiment of FIG. 6, the pulse-based addressing system sets variable R to the start of the address space and then linearly proceeds through the address space until all of the circuit-nodes have been identified.

Although the embodiment of FIG. 6 linearly proceeds through the entire address space, many other means of searching through the address space may be used. If a large address space is used in order to reduce collisions then other techniques may be used to more quickly locate the circuit-node addresses. For example, the system may instruct circuit-nodes matching a small subset of address bits to send a signal pulse. If no signal pulse is received, then all the addresses with that particular subset of address bits can be eliminated from the search. Various well known search algorithms may be used to quickly identify the addresses assigned to the circuit-nodes. In other embodiment, the circuit nodes may be requested to transmit a subset of their assigned addresses on a shared return data path. The information on the shared return data path can be used to eliminate some address areas not specified by any circuit-nodes. To simplify the disclosure, only the simple linear search method will be disclosed.

Referring to stage 630, the first step of the loop is to have the pulse-based addressing system prepare the pulse detectors 591 and 592, and then instruct the circuit-node at address R to send a pulse on the common serial line. At stage 632, the pulse-based addressing system detects the times at which pulses are received by the two pulse detectors 591 and 592 (if any pulses are received).

How the pulse-based addressing system proceeds at stage 650 then depends on what was detected at stage 632. If no pulse was detected, then no circuit-node was assigned address R. Therefore, the pulse-based addressing system proceeds to stage 652 where the system advances R to the next address in the defined address range. If the system is at the last address in the defined address range, it will start back at the first address in the defined address range. The pulse-based addressing system then proceeds back to stage 630 to begin testing the next address.

Referring back to stage 650, if more than one pulse is detected by the two pulse detectors 591 and 592, then the pulse-based addressing system proceeds to stage 655 to handle the situation wherein more than one circuit-node was assigned the same address. At stage 655 the pulse-based addressing system instructs the circuit-nodes at address R to select new random addresses and then proceeds back to stage 630.

In an alternate embodiment, the pulse-based addressing system will assign unique addresses to all the different circuit-nodes on a serial line before attempting to identify their relative positions on the serial line. For example, with the system disclosed in U.S. Pat. No. 8,344,659 entitled "System and method for lighting power and control system" granted on Jan. 1, 2013, when two circuit-nodes have the same address those two circuit nodes will attempt to charge their local power supply during the same time slot. This will cause a detectable voltage drop on the serial line. Thus, this property can be used to identify when circuit-nodes have been assigned the same random address and thus different addresses must be assigned.

Referring back to stage 650, if a single pulse was detected by the two pulse detectors 591 and 592 then the pulse-based addressing system can then proceed to stage 660 to assign an address to that single circuit-node that emitted the pulse. At stage 660, the pulse-based addressing system calculates the location of the circuit-node that emitted the pulse based upon the times when the pulse was received by the two pulse detectors 591 and 592. If the time when the pulse is received is inconclusive then the system could return back to stage 630 to emit a pulse again to obtain a better reading. After calculating the location of the circuit-node that emitted the pulse at stage 660, the pulse-based addressing system assigns a new address (not in the random range) to the circuit-node at stage 665. The circuit-node may assign the address to itself by writing the address to some non-volatile memory system such as flash memory or a set of fuses. At stage 670, the pulse-based addressing system determines whether this was the last circuit-node in the multi-circuit-node system. If this was not the last circuit-node in the multi-circuit-node system then the pulse-based addressing system proceeds to stage 652 to increment the address counter R to the next address in the defined address range and then proceeds back to stage 630 to continue addressing the remaining circuit-nodes.

In an alternate embodiment, the pulse-based addressing system may simple store the times when the pulses were received at stage 660 and then proceed to stage 670 to determine if all the circuit nodes have been identified. If all the nodes have not been identified, the system proceeds back to stage 652 to continue searching. If all the nodes have been identified then such an alternate embodiment would then compare all the stored pulse times from all the circuit-nodes to identify their relative order. The circuit nodes could then be assigned new sequential addresses based upon their relative order.

Referring back to stage 670, after the last circuit-node has been identified, the pulse-based addressing system proceeds to stage 675. At this point all of the individual circuit-nodes on the multi-circuit-node serial line have been identified and assigned new unique addresses based on their location in the series. Thus, at stage 675, the system instructs all the circuit nodes to store their assigned unique addresses in a non-volatile format. This may be performed by writing to flash memory, burning a pattern in a set of fuses, or using another non-volatile storage system.

Finally, at stage 680, the pulse-based addressing system deactivates the multi-circuit-node system. The multi-circuit-node system may then be removed from the pulse-based addressing system at stage 690.

Emitter Based Addressing Systems

The individual circuit-nodes on a multi-circuit-node system may be able to emit some type of detectable output. Such an output system may be used to create an emitter based addressing system.

FIG. 7A illustrates an emitter-based system for assigning unique addresses to the serially arranged circuit-nodes 750-1 to 750-N. In the system of FIG. 7A, each of circuit-nodes 750-1 to 750-N can individually emit a detectable output that is detectable by a sensor 780 of the emitter-based addressing controller 790. The detectable output may comprise many different possible outputs such as sound, light, heat, motion, or any other type of detectable output from an electric circuit. In one embodiment, the output comprises light from a light source such as a light-emitting diode (LED) circuit. In some embodiments, multiple different detectors may be used instead of just one detector 780. One detector may cover a set of circuit-nodes. FIG. 7B illustrates one embodiment wherein each circuit-node 750-1 to 750-N has its own sensor 780-1 to 780-N.

Figure 8:
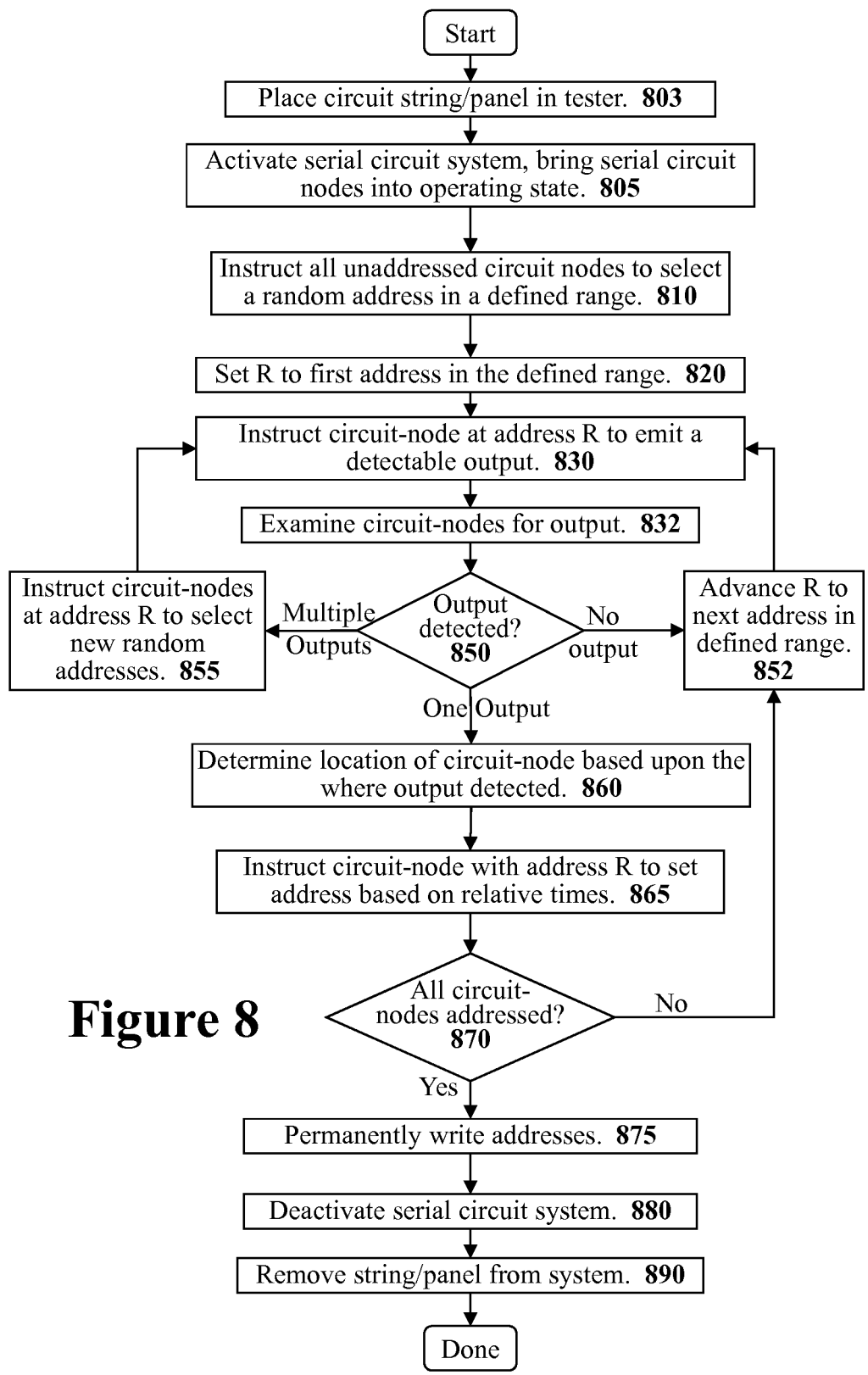
FIG. 8 illustrates one embodiment of a flow diagram describing how the emitter-based addressing system illustrated in FIGS. 7A and 7B may be used to assign unique addresses to the individual circuit-nodes arranged in a series.

The emitter-based addressing system of FIGS. 7A and 7B operates by initially assigning random addresses to each circuit-node and then having the individual circuit-nodes 750-1 to 750-N emit a detectable output when a request is received. FIG. 8 illustrates one embodiment of a flow diagram describing how the emitter-based addressing system illustrated in FIGS. 7A and 7B may be used to assign unique addresses to the individual circuit-nodes arranged in a series.

Referring to stage 803, the multi-circuit-node system is placed into the emitter-based addressing system. After being placed into the emitter-based addressing system, the emitter-based addressing controller 790 then activates the multi-circuit-node system at stage 805 and brings each of the individual circuit-nodes on the serial line into an active state.

At stage 810, the emitter-based addressing controller 790 instructs all of the unaddressed circuit-nodes on the serial line to select a random address in a defined range of addresses. Next, at stage 820, the emitter-based addressing system sets a variable R to the first address in the defined address range of the random addresses.

The emitter-based addressing system then begins a loop starting at stage 830 to assign locally unique addresses to all of the individual circuit-nodes 750-1 to 750-N in the multi-circuit-node system. The loop will proceed through the address space from which random addresses were selected and assigned to the circuit-nodes.

Referring to stage 830, the first step of the loop is to have the emitter-based addressing controller 790 instruct the circuit-node at address R to emit a detectable output. At stage 832, the emitter-based addressing controller 790 examines all the circuit-nodes for any emitter output.

How the emitter-based addressing system proceeds at stage 850 then depends on what was detected at stage 832. If no output was detected from any of the circuit-nodes, then no circuit-node was assigned address R. Thus, the emitter-based addressing system proceeds to stage 852 where the system advances to the next address R in the defined address range. If it is at the last address in the range, then the system will start back at the first address in the defined address range. The emitter-based addressing system then proceeds back to stage 830 to test the next address.

Referring back to stage 850, if more than one circuit-node emits an output then the emitter-based addressing system proceeds to stage 855 to handle the situation wherein more than one circuit-node received the same random address. At stage 855 the emitter-based addressing system instructs the circuit-nodes at address R to select new random addresses and then proceeds back to stage 830. Note that this issue may be eliminated by using techniques to assign unique random addresses to all of the circuit-nodes as previously described in this document.

Referring again to stage 850, if a single circuit-node emitted an output then the emitter-based addressing system can then proceed to stage 860 to assign an address to that single circuit-node. At stage 860, the emitter-based addressing system determines the location of the circuit-node that emitted the output. With a single sensor system as illustrated in FIG. 7A, the system can determine the circuit-node's location by where on the sensor the output was detected. (For example, where on camera image a light output was detected.) With a multiple sensor system as illustrated in FIG. 7B, the identity of the sensor that detects an output determines the location of the circuit-node that emitted the output. After determining the location of the circuit-node that emitted the output, the emitter-based addressing system assigns a new address (not in the random range) to the circuit-node at stage 865.

At stage 870, the emitter-based addressing system determines whether all of the circuit-nodes in the multi-circuit-node system have been detected. If this was not the last circuit-node in the multi-circuit-node system then the emitter-based addressing system proceeds to stage 852 to increment the address counter R to the next address in the defined address range and then proceeds back to stage 830 to continue addressing the remaining circuit-nodes.

Referring back to stage 870, after the last circuit-node has been identified and assigned a unique address, the emitter-based addressing system proceeds to stage 875. At stage 675, the system instructs all the circuit nodes to locally store their assigned unique addresses in a non-volatile format. This may be performed by writing to flash memory, burning a pattern in a set of fuses, or using another non-volatile storage system. Note that the emitter based system uses an emitter circuit on each circuit-node. Thus, the emitter-based system can be used to test the emitter on each circuit-node while performing the addresses. However, the system must have some type of watchdog circuit that will recognize that an address cannot be assigned to a circuit-node because the emitter associated with that circuit-node is not working.

Finally, at stage 880, the emitter-based addressing system deactivates the multi-circuit-node system. The multi-circuit-node system may be removed from the emitter-based addressing system at stage 890.

The preceding technical disclosure is intended to be illustrative, and not restrictive. For example, the above-described embodiments (or one or more aspects thereof) may be used in combination with each other. Other embodiments will be apparent to those of skill in the art upon reviewing the above description. The scope of the claims should, therefore, be determined with reference to the appended claims, along with the full scope of equivalents to which such claims are entitled. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract is provided to comply with 37 C.F.R. § 1.72(b), which requires that it allow the reader to quickly ascertain the nature of the technical disclosure. The abstract is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment.

We claim:

1. A method of assigning addresses to a plurality of individual circuit-nodes on a serial line, said method comprising:

activating said plurality of individual circuit-nodes on said serial line;

assigning unique random addresses to said plurality of individual circuit-nodes on said serial line;

instructing an individual circuit-node at one of said unique random addresses to emit a signal pulse;

receiving said signal pulse at a signal detector along said serial line from said individual circuit node at said unique address;

recording a time when said signal pulse was received from said individual circuit node at said unique address;

repeating said steps of instructing a circuit-node to emit a signal pulse, receiving said signal pulse, and recording a time when said signal pulse was received for all of said unique random addresses assigned to said plurality of individual circuit nodes;

determining a relative position of each circuit node of said plurality of individual circuit nodes based upon said times when said signal pulses were received; and assigning a unique address each individual circuit-node of said plurality of individual circuit nodes based upon said relative position of each circuit node such that said one stimulated individual circuit-node permanently assigns itself said unique address.

2. The method of assigning addresses to a plurality of individual circuit-nodes on said serial line as set forth in claim 1 wherein said times when said signal pulses were received are arrange in relative order.

3. The method of assigning addresses to a plurality of individual circuit-nodes on said serial line as set forth in claim 1 wherein said circuit-node permanently assigns itself said unique address by burning a set of fuses.

4. The method of assigning addresses to a plurality of individual circuit-nodes on said serial line as set forth in claim 1 wherein said circuit-node permanently assigns itself said unique address by writing into flash memory.

5. The method of assigning addresses to a plurality of individual circuit-nodes on said serial line as set forth in claim 1 wherein assigning unique random addresses to said plurality of individual circuit-nodes on said serial line comprises having said plurality of individual circuit-nodes assign themselves random addresses until said plurality of individual circuit-nodes have unique addresses.

\* \* \* \* \*